United States Patent
Dhar et al.

(10) Patent No.: US 11,310,292 B2
(45) Date of Patent: Apr. 19, 2022

(54) APPLICATION AWARE ANNOTATIONS IN ONLINE COLLABORATIVE SESSIONS

(71) Applicant: Cisco Technology, Inc., San Jose, CA (US)

(72) Inventors: Rajarshee Dhar, Assam (IN); Deepesh Arora, Punjab (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/992,655

(22) Filed: Aug. 13, 2020

(65) Prior Publication Data

US 2022/0053035 A1     Feb. 17, 2022

(51) Int. Cl.
| | |
|---|---|
| *H04L 29/06* | (2006.01) |
| *H04L 65/1083* | (2022.01) |
| *H04L 65/1096* | (2022.01) |
| *H04L 65/403* | (2022.01) |

(52) U.S. Cl.
CPC ...... *H04L 65/1086* (2013.01); *H04L 65/1096* (2013.01); *H04L 65/403* (2013.01)

(58) Field of Classification Search
None
See application file for complete search history.

(56) References Cited

U.S. PATENT DOCUMENTS

| | | | |
|---|---|---|---|
| 5,577,188 A | 11/1996 | Zhu | |
| 9,781,179 B2 | 10/2017 | Hong et al. | |
| 10,511,551 B2 | 12/2019 | Han et al. | |
| 2009/0013044 A1* | 1/2009 | Stull | G06Q 10/10 709/205 |
| 2009/0106662 A1* | 4/2009 | Ye | G06F 3/1454 715/740 |
| 2010/0262925 A1* | 10/2010 | Liu | H04L 65/1053 715/759 |
| 2011/0289401 A1* | 11/2011 | Fischer | G06F 40/103 715/232 |
| 2014/0281875 A1 | 9/2014 | Branton et al. | |
| 2017/0017632 A1 | 1/2017 | York et al. | |
| 2018/0260494 A1* | 9/2018 | Wheeler | G06T 19/20 |
| 2019/0042553 A1* | 2/2019 | Raleigh | G06F 40/106 |

(Continued)

OTHER PUBLICATIONS

Microsoft Docs, "Process.GetProcessesByName Method", 10 pages, retrieved from Internet Aug. 13, 2020; https://docs.microsoft.com/en-us/dotnet/api/system.diagnostics.process.getprocessesbyname?view=netcore-3.1.

(Continued)

*Primary Examiner* — Joshua Joo
(74) *Attorney, Agent, or Firm* — Edell, Shapiro & Finnan, LLC

(57) ABSTRACT

An online collaborative session application executing on a processing device tracks a state of an application shared by the processing device over an online collaborative session. The online collaborative session application receives data indicative of an annotation made to an instance of the application as part of the online collaborative session. A first location of the annotation relative to the instance of the application is determined from the data indicative of the annotation and the state of the application. Based on the tracking, a change to the state of the application is determined. A second location of the annotation is determined based on the change of the state of the application.

20 Claims, 13 Drawing Sheets

(56) References Cited

U.S. PATENT DOCUMENTS

| | | | | |
|---|---|---|---|---|
| 2019/0087438 | A1* | 3/2019 | Nelbach, Jr | G06F 16/176 |
| 2019/0138191 | A1* | 5/2019 | Latzina | G06F 40/169 |
| 2020/0134255 | A1* | 4/2020 | Nocedal | G06F 40/14 |
| 2020/0137326 | A1* | 4/2020 | Jahagirdar | G06T 3/40 |
| 2020/0348900 | A1* | 11/2020 | Zhang | G06F 40/169 |

OTHER PUBLICATIONS

Microsoft Docs, "RECT structure", 2 pages, Apr. 18, 2018; https://docs.microsoft.com/en-us/previous-versions//dd162897(v=vs.85).

Zoom Help Center, "Using annotation tools on a shared screen or whiteboard", 15 pages, retrieved from Internet Aug. 13, 2020; https://support.zoom.us/hc/en-us/articles/115005706806-Using-annotation-tools-on-a-shared-screen-or-whiteboard.

Stack Overflow, "Getting external application minimize and maximize status. Cannot figure out error", 3 pages, retrieved from Internet Aug. 13, 2020; https://stackoverflow.com/questions/18035065/getting-external-application-minimize-and-maximize-status-cannot-figure-out-err.

Mark S. Rasmussen, "Getting Window Location and Size Using PInvoke", 5 pages, retrieved from Internet Aug. 13, 2020; https://improve.dk/getting-window-location-and-size/.

Chrome Web Store, "Annotate: Web Annotations with Screen Sharing", 2 pages, retrieved from Internet Aug. 13, 2020; https://chrome.google.com/webstore/detail/annotate-web-annotations/gdojjgflncpbcfmenbkndfhoamlhajmf.

Microsoft Docs, "GetWindowRect function", 4 pages, Dec. 5, 2018; https://docs.microsoft.com/en-us/windows/win32/api/winuser/nf-winuser-getwindowrect.

Apple Developer Connection, "NSWorkspace", 14 pages, Apple Computer, Inc., Jan. 12, 2004; http://mirror.informatimago.com/next/developer.apple.com/documentation.

Cisco, "Annotate in Cisco Webex Meetings", 7 page, May 4, 2020; https://help.webex.com/en-us/n03wop9/Annotate-in-Cisco-Webex-Meetings.

Stack Overflow, "Cannot get or set the window size of some apps using AppleScript?", 3 pages, retrieved from Internet Aug. 13, 2020; https://stackoverflow.com/questions/12021362/cannot-get-or-set-the-window-size-of-some-apps-using-applescript.

Stack Overflow, "AppleScript—Get the Bounds of Every open Window", 5 pages, retrieved from Internet Aug. 13, 2020; https://stackoverflow.com/questions/52301680/applescript-get-the-bounds-of-every-open-window.

"Sharing your screen, content, or second camera," Zoom Help Center, 4 pages, retrieved from Internet Mar. 21, 2021, https://support.zoom.us/hc/en-us/articles/201362153.

"Sharing computer sound during screen sharing," Zoom Help Center, 2 pages, retrieved from Internet Mar. 21, 2021, https://support.zoom.us/hc/en-us/articles/201362643.

"Optimizing a shared video clip in full screen," Zoom Help Center, 2 pages, retrieved from Internet Mar. 21, 2021, https://support.zoom.us/hc/en-us/articles/202954249.

"Sharing a whiteboard," Zoom Help Center, 2 pages, retrieved from Internet Mar. 21, 2021, https://support.zoom.us/hc/en-us/articles/205677665.

"Using annotation tools on a shared screen or whiteboard," Zoom Help Center, 3 pages, retrieved from Internet Mar. 21, 2021, https://support.zoom.us/hc/en-us/articles/115005706806.

\* cited by examiner

FIG.1
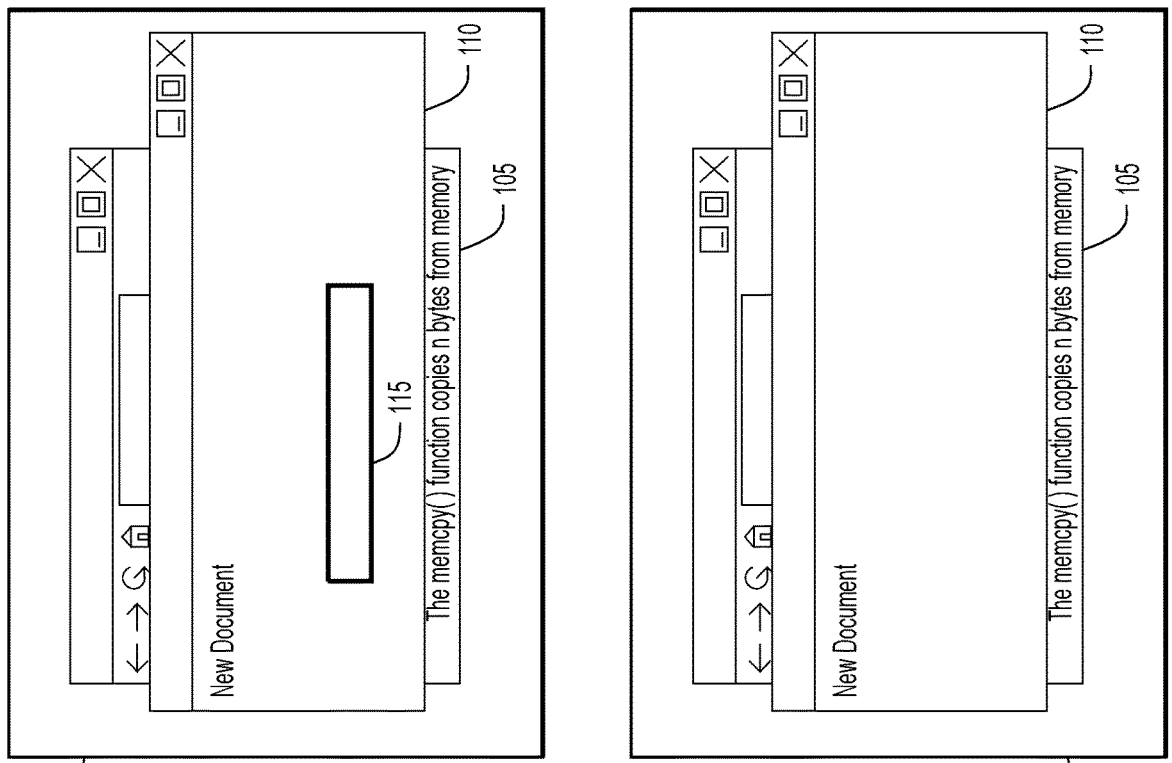
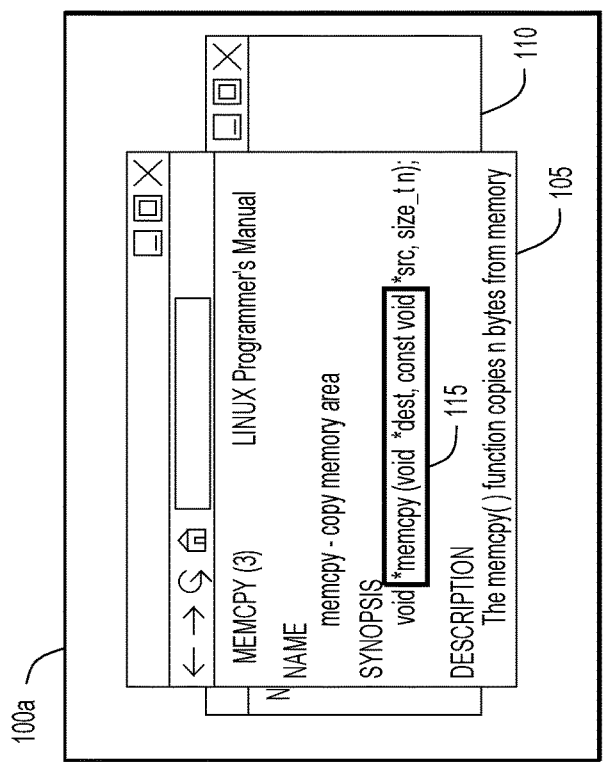

```
                                                                    300

⎡  [
    ⎢     {
    ⎢       ⎡  "ApplicationId" : "web browser",   (To identify the application)
    ⎢       ⎢  "InstanceId": 1,                    (To identify the instance out of multiple windows opened, if any, otherwise
    ⎢       ⎢                                      1 as the default value)
    ⎢   312 ⎨  "Priority" : "3"
    ⎢       ⎢
    ⎢       ⎢  "ThreadId" : 1,                     (To identify the thread inside the application, if any, otherwise 1 as the
    ⎢       ⎣                                      default value)
    ⎢       ⎡  "AreaCovered" : [                   (Defines boundary of the application, which will be used to redraw the
    ⎢       ⎢                                      pixels in case application is in focus again)
    ⎢       ⎢     {
    ⎢       ⎢        "x" : 0,   ⎫
    ⎢       ⎢        "y" : 0    ⎬ 316a
310 ⎨       ⎢     },            ⎭
    ⎢       ⎢     {
    ⎢       ⎢        "x" : 500, ⎫
    ⎢   314 ⎨        "y" : 0    ⎬ 316b
    ⎢       ⎢     },            ⎭
    ⎢       ⎢     {
    ⎢       ⎢        "x" : 0,   ⎫
    ⎢       ⎢        "y" : 670  ⎬ 316c
    ⎢       ⎢     },            ⎭
    ⎢       ⎢     {
    ⎢       ⎢        "x" : 500, ⎫
    ⎣       ⎣        "y" : 670  ⎬ 316d
                                ⎭
```

FIG.3A

```
                    }
                ],
        352 {  "IsPixelDataAvailable" : 1,
               "PixelColor" : "0xF53636",
               "PixelLocationData": [       (These are the x,y coordinates of each pixel drawn)
                    {
                        "x" : 1,      } 356a
                        "y" : 1
                    },
                    {
        354 {           "x" : 2,      } 356b
                        "y" : 3
                    },
 350 {              ...
                    ...
                    ...
                    {
                        "x" : 10,     } 356x
                        "y" : 19
                    }
                ],
               "IsTextDataAvailable" : 0,
               "TextColor" : "",
               "TextSize" : 0,
        358 {  "TextFont" : "",
               "TextPosition" : [],
               "TextBoxWidth" : 0,
               "TextPayload" : "",
        },
```

```
                                                                                          400
     ⎧  ⎧  {
     ⎪  ⎪     "ApplicationId" : "terminal",    (To identify the application)
     ⎪ 412 ⎨   "InstanceId": 1,
     ⎪  ⎪     "Priority" : "2"
     ⎪  ⎪     "ThreadId" : 2,                  (Indicating 2nd tab of the terminal)
     ⎪  ⎩     "AreaCovered" : [                (Defines the boundary of the application, which will be used to redraw
     ⎪                                         the pixels in case application is in focus again)
     ⎪     ⎧  {
     ⎪     ⎪      "x" : 0,    ⎫
     ⎪     ⎪      "y" : 0     ⎬ 416a
     ⎪     ⎪  },              ⎭
     ⎪     ⎪  {
 410 ⎨     ⎪      "x" : 600,  ⎫
     ⎪  414⎨      "y" : 0     ⎬ 416b
     ⎪     ⎪  },              ⎭
     ⎪     ⎪  {
     ⎪     ⎪      "x" : 0,    ⎫
     ⎪     ⎪      "y" : 720   ⎬ 416c
     ⎪     ⎪  },              ⎭
     ⎪     ⎪  {
     ⎪     ⎪      "x" : 600,  ⎫
     ⎪     ⎪      "y" : 720   ⎬ 416d
     ⎪     ⎩  }
     ⎪  ],
                                          ⎯ 452
        "IsPixelDataAvailable" : 0, ⎯
        "PixelColor" : "", ⎯⎯⎯⎯⎯ 453
        "PixeLocagtionData": [], ⎯
     ⎧  "IsTextDataAvailable" : 1, ⎯⎯ 454
     ⎪  "TextColor" : "0xF54136",
     ⎪  "TextSize" : 14,
 450 ⎨  "TextFont" : "Italic",
     ⎪  "TextPosition" : [
     ⎪  458 ⎧ {
     ⎪      ⎪    "x" : 32,   ⎫
     ⎪      ⎨    "y" : 45    ⎬ 460
     ⎪      ⎪  }             ⎭
     ⎪      ⎩ ],
     ⎪      "TextBoxWidth" : 50,
     ⎪   "TextPayload" : "This is sample text data", ⎯ 462
     ⎩  },
```

510 {
    {
      "ApplicationId" : "chrome",   (To identify the application)
      "InstanceId": 2,           (Indicating 2nd chrome window)
      "Priority" : "1"
      "ThreadId": 3,            (Indicating tab no 3 of the chrome)
      "AreaCovered" : [   (This part covers the boundary of the application, which will be used to
                                 redraw the pixels in case application is in focus again)
    {
      "x" : 0,
      "y" : 0
    },
    {
      "x" : 500,
      "y" : 0
    },
    {
      "x" : 0,
      "y" : 670
    },
    {
      "x" : 500,
      "y" : 670
    }
}

FIG.5A

```
],
    "IsPixelDataAvailable" : 1,
    "PixelColor" : "0xF53636",                    } 552
    "PixelLocationData": [
    {
        "x" : 1,
        "y" : 1
    },
    {
        "x" : 2,
        "y" : 3
    },
    ...
    ...
    ...
    {
        "x" : 10,
        "y" : 19
    }
],
    "IsTextDataAvailable" : 1,
    "TextColor" : "0xF54136",
    "TextSize" : 14,
    "TextFont" : "Italic",
    "TextPosition" : [
    {
        "x" : 32,
        "y" : 45
    }
],
    "TextBoxWidth" : 50,
    "TextPayload" : "This is sample text data",
},
]
```

550 encompasses the entire block; 554 covers the PixelLocationData array; 558 covers the text data section; 500 labels the figure.

FIG.5B

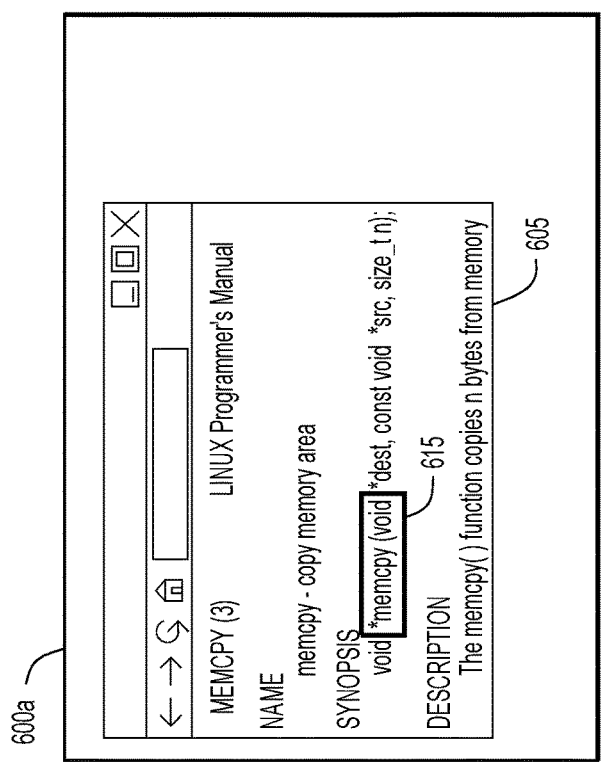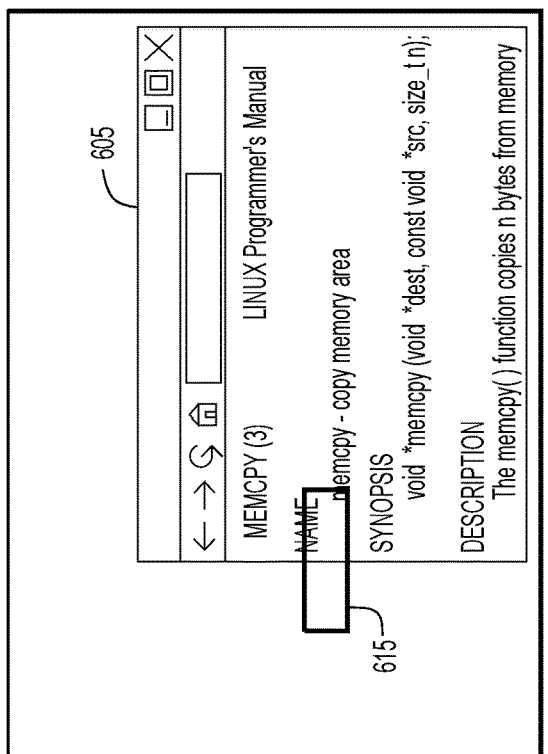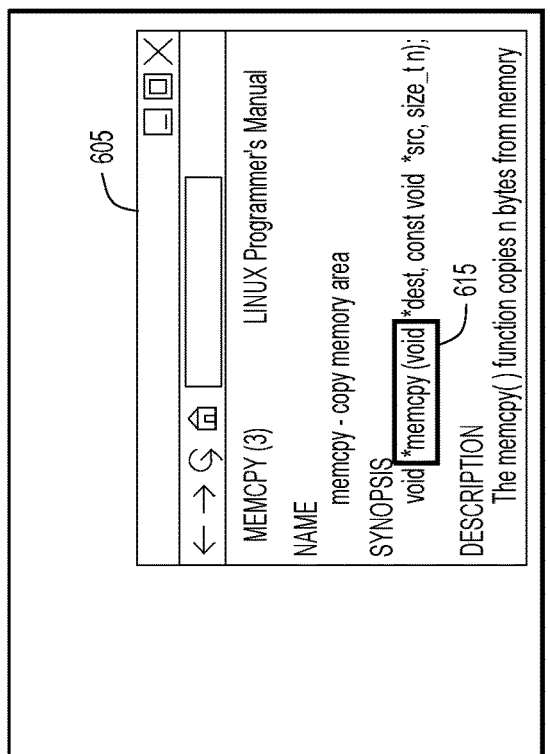
FIG. 6

US 11,310,292 B2

APPLICATION AWARE ANNOTATIONS IN ONLINE COLLABORATIVE SESSIONS

TECHNICAL FIELD

The present disclosure relates to online collaborative sessions, and more particularly, to providing annotations to shared documents and applications in online collaborative sessions.

BACKGROUND

Online collaborative sessions, also referred to as "video conference calls" or "online meetings," allow participants to collaborate online, which includes the ability to share the contents of the users' displays. As the workforce adopts a telecommuting business model, and as schools and universities move towards distance learning platforms, online collaborative sessions are becoming more important and more common place.

Online collaborative sessions permit users to annotate (e.g., draw on, mark-up, add text) to the online collaborative session screen in order to highlight portions of the content shared through the online collaborative session. When implemented effectively, these annotation tools may enhance the online collaborative session experience, while poor implementations may confuse the session participants.

BRIEF DESCRIPTION OF THE DRAWINGS

FIG. 1 is an illustration of displays from online collaborative sessions comparing the application aware annotation techniques of the present disclosure to related art annotation techniques within the context of application switching, according to an example embodiment.

FIGS. 3A and 3B illustrate metadata used to implement a non-text, application aware annotation, according to an example embodiment.

FIG. 4 illustrates metadata used to implement a text-based, application aware annotation, according to an example embodiment.

FIGS. 5A and 5B illustrate metadata used to implement an application aware annotation that combines text and non-text features, according to an example embodiment.

FIG. 6 is an illustration of displays from online collaborative sessions comparing the application aware annotation techniques of the present disclosure to related art annotation techniques within the context of shifting an application window, according to an example embodiment.

DESCRIPTION OF EXAMPLE EMBODIMENTS

Overview

Figure 2:
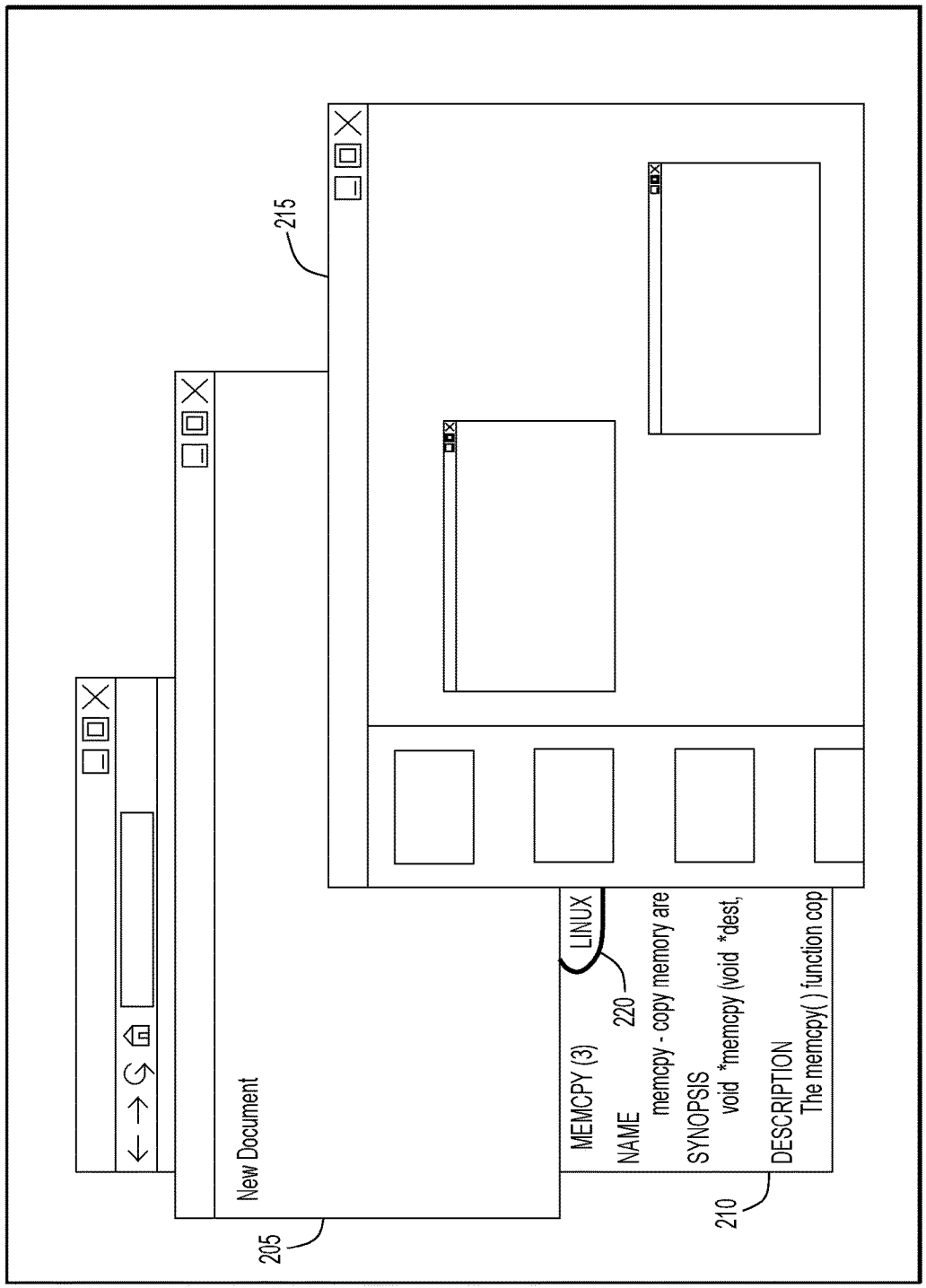
FIG. 2 is an illustration of a display that implements the application aware annotation techniques of the present disclosure using a layered architecture, according to an example embodiment.

According to example embodiments, an online collaborative session application executing on a processing device tracks a state of an application shared by the processing device over an online collaborative session. The online collaborative session application obtains data indicative of an annotation made to an instance of the application as part of the online collaborative session. A first location of the annotation relative to the instance of the application is determined from the data indicative of the annotation and the state of the application. Based on the tracking, a change to the state of the application is determined. A second location of the annotation is determined based on the change of the state of the application.

EXAMPLE EMBODIMENTS

With reference now made to FIG. 1, depicted therein is a display 100a of an online collaborative session at a first time. According to one specific example embodiment, an instructor is conducting an online lecture to students staying in remote locations because of, for example, a pandemic, such as the COVID-19 pandemic. The online collaborative session lecture may be conducted via an online collaborative system, such as Cisco's Webex® system. As part of the presentation, the instructor has displayed two applications, the first of which is an instruction manual document displayed in a web browser application 105 and the other of which is a computer terminal application 110. During the online collaborative session, the instructor demonstrates the working of a computer system operation by referring to a detail in a page of the instruction manual document displayed in web browser application 105 while concurrently demonstrating the computer system operation through its execution in computer terminal application 110.

The instructor highlights a portion of the instruction manual document in web browser application 105 through annotation 115. The instructor then clicks on computer terminal application 110 to show the execution go the operation in computer terminal application 110. Computer terminal application 110 comes into focus in response to a mouse click event from the instructor, which arranges computer terminal application 110 in front of web browser application 105, as illustrated in displays 100b and 100c. Display 100b illustrates an online collaborative session that does not implement example embodiments of the techniques of the present disclosure, and illustrates the problems that the techniques of the present disclosure may be used to overcome. Display 100c, on the other hand, illustrates an online collaborative session that implements example embodiments of the techniques of the present disclosure.

As illustrated in display 100b, annotation 115 continues to be displayed, overlaid on computer terminal application 110 even though the intent of annotation 115 was to highlight content of web browser application 105. Displaying annotation 115 on computer terminal application 110 may be confusing or problematic because annotation 115 remains visible while the content that annotation 115 is intended to highlight in web browser application 105 is no longer visible in display 100b.

Display 100c, on the other hand, ensures that annotation 115 of display 100a is not included in display 100c by implementing example embodiments of the techniques of the present disclosure. In other words, the annotation features of display 100c are "application aware." According to the techniques of the present disclosure, annotations may be made within or to multiple applications and none of these applications would interfere with the annotations in the other applications. Moreover, with annotations being application aware, the annotations may also be adjusted if an application is moved within display 100c. The techniques of the present disclosure may be implemented to mitigate the above-above described issues with display 100b and may be used to deliver an immersive meeting/annotation experience for online collaborative session users.

In example embodiments of the present disclosure, an online collaborative session application is configured to track all active applications running on the system, including their respective states (i.e., is the application in the background/maximized/minimized/in focus, etc.). Basically, the online collaborative session client reads all such events from the underlying operating system and uses this information to provide "application aware" annotations.

In implementing the techniques of the present disclosure, the online collaborative session application (e.g., an online collaborative session client application or an online collaborative session server application) executing on a processing device associated with the lecturer tracks the state of applications 105 and 110, which may include tracking one or more of the location of the windows associated with applications 105 and 110 in display 100c, the portions of display 100c covered by applications 105 and 110, the relative "vertical" stacking of applications 105 and 110, or other features consistent with the teachings of the present disclosure and known to the skilled artisan. "Vertical," as used herein, refers to the direction going into or out of a display. In other words, in display 100a, application 105 is arranged on top of application 110 in the vertical direction, while in displays 100b and 100c, application 110 is arranged on top of application 105 in the vertical direction.

The processing device associated with the lecturer may track the relative location of applications 105 and 110 in the vertical direction in on-line collaborative sessions in which multiple application windows may be shared at the same time. This vertical location tracking may be necessary to appropriately display annotations when there are more than two applications within the display, and therefore, knowing which application is in focus is insufficient to determine the relative stacking of the applications that are not in focus. For example, as illustrated in FIG. 2, online collaborative session display 200 includes three applications, application 205 and application 210 that are not in focus, and application 215 that is in focus. Annotation 220 is also displayed, which was made in application 210. If the processing device associated with online collaborative session display 200 only tracked which of applications 205, 210 and 215 is currently in focus, which in the example of FIG. 2 is application 215, online collaborative session display 200 may incorrectly display annotation 220 as under application 215, but not also under application 205. By tracking the relative vertical location of all three of applications 205, 210 and 215, annotation 220 is displayed as being arranged under both of application 215 and 205, even though application 205 is not active.

According to the techniques of the present disclosure, the tracking provided by the online collaborative session client maintains states and logs events (e.g., which application is in background/maximized/minimized/in focus, etc.). For example, before sharing the screen, the online collaborative session client allows a user to choose which application window is to be shared. When the shared application is minimized, blank space is shown to the user (i.e., it does capture the event of minimization). According to the techniques of this disclosure, these events are bound with the annotations so that the feature becomes "application aware."

The techniques of the present disclosure may implement application awareness through application tracking within an online collaboration session client application via data transfers from the operating system of the processing device executing the online collaborative session client. For example, when a user switches from a first application to a second application by selecting the second application with a mouse pointer, the online collaborative session client is configured to receive data, such as the metadata related to all the active applications, from the operating system. In other words, the selection of a mouse pointer should trigger an event of transferring the applications' state information from the operating system to the online collaborative session client. The online collaborative session client may also continuously poll the operating systems for events or register for callbacks of events that change an application's state, such as changes in application focus, changes in application windows within a display, or changes to the displayed page, tab, sheet, slide or other portion of an application document. Data transfers from the operating system to the online collaborative session client may also take place at predetermined time intervals during the online collaborative session.

The data received from the operating system may then be bound with annotation data so that the placement of the annotation data may be application aware. Once the application state data and the annotation data are bound together, the online collaborative session client may store the data in a structured format that will permit the online collaborative session to redraw annotations in response to application state changes. A first example of application state data bound to annotation data is illustrated in metadata 300 of FIGS. 3A and 3B.

As illustrated in FIGS. 3A and 3B, metadata 300 includes application data 310 and annotation data 350. Application data 310 includes identifying data 312 that includes an application identifier, an instance identifier and a thread identifier. According to the example of FIGS. 3A and 3B, the application identifier identifies the application as "web browser," the instance identifier as "1" and the thread identifier as "1." Accordingly, the application state being tracked in application data 310 may track a "web browser" application (based on the application identifier of "web browser") with a first window (based on the instance identifier of "1") and a first tab within the first window (based on the thread identifier of "1"). In other example embodiments, the thread identifier may identify a page of a word processing document, a sheet of a spreadsheet application, a page of an electronic document, a slide of a presentation document, or other possible threads known to the skilled artisan. Furthermore, additional identifiers may be used if it is necessary to provide more than three levels of granularity. For example, a digital document application may display an application window. This application window may display multiple tabs, with each tab displaying an electronic document with multiple pages. The application identifier may identify the digital document application, an instance identifier may identify an application window, a thread identifier may identify a tab associated with a particular document, and a fourth identifier may identify a particular page within the document.

Also included in identifying data 312 is a "priority" value which indicates the relative vertical position of the instance identified in identifying data 312. The "priority" value may be embodied as an integer value of priority in this metadata for each application window, with threads within the same application window having the same priority. The priority value may be in incremental form. For example, there may be four windows open with priority values "1," "2," "3" and "4," respectively. The window with priority "4" may be given highest priority. If the window with priority "1" is selected through a mouse-click event that brings the window in-focus (i.e., in foreground) then the priority value for this window may change to "5" from "1" and other windows' priority values may remain unchanged. Therefore, the in-focus window may now have the highest priority. Whichever window comes into focus next may be given the priority of "6," and so on.

Application data 310 also includes a description of the area covered by the application being tracked via area data 314. Specifically, area data 314 includes the location of the pixels associated with the vertices or corners of the application window through pixel coordinates 316*a-d*.

Annotation data 350 of FIG. 3B defines an annotation bound to the application tracked through application data 310. The annotation data 350 may be tailored to different types of annotations. For example, annotation data 350 of FIG. 3B defines an image or drawn annotation, while annotation data 450 of FIG. 4 defines a text annotation, as described in detail below. Included in annotation data 350 is pixel data 352. Pixel data 352 includes a pixel data flag ("IsPixelDataAvailable") which has a value of "1," meaning the annotation associated with annotation data 350 includes pixel data. The color for the pixels of the annotation is given by the "PixelColor" data. The "PixelColor" data of FIG. 3B indicates that the annotation has the color associated with the hexadecimal color code of "0xF53636," which corresponds to a red-orange color. Annotation data 350 also includes pixel location data 354 in the form of coordinates 356*a-x*. These coordinates define the location of the individual pixels that make up the annotation defined by annotation data 350. The values given by coordinates 356*a-x* may be relative to the area data 314. According to other example embodiments, coordinates 356*a-x* may be relative to the display of the online collaborative session.

According to other example embodiments, annotation data 350 may include descriptions of drawn annotations through other means, such as mathematical formulas describing vector-based annotations. In such example embodiments, the location and mathematical formulas that describe the vector-based annotations may be used in place of coordinates 356*a-x*.

Finally, annotation data 350 also includes annotation text data 358. Annotation text data 358 defines the text associated with the annotation. Annotation text data 358 includes a text flag "IsTextDataAvailable," which according to the example of FIG. 3B has a value of "0" as the annotation defined by annotation data 350 only contains pixel data, not text. The remaining values in annotation text data 358, which define the text, color, size, font, position and text box width for the text annotation, will be described in detail with reference to FIG. 4.

With reference now made to FIG. 4, depicted therein is metadata 400, which is similar to that of metadata 300 of FIGS. 3A and 3B, and includes application data 410 and annotation data 450. Application identifying data 412 identifies the application as "terminal" and that the data included in metadata 400 is for a first instance and second thread of the "terminal" application. The window associated with this instance has a priority value of "2." Area data 414 defines the area covered by the application through application window pixel coordinates 416*a-d*. Unlike metadata 300 of FIGS. 3A and 3B, metadata 400 of FIG. 4 defines a text annotation instead of an image or drawing annotation. Therefore, the pixel flag of pixel data 452 has a value of "0" indicating that there is no pixel data associated with the annotation, no pixel color is given in pixel color data 453, and the pixel location data 454 is empty, containing no pixel coordinates to associate with the annotation.

Annotation text data 458, on the other hand, is populated with data that defines a text annotation. Specifically, the text annotation flag has a value of "1" and the text color value has a value of "0xF54136," which gives a red-orange color. The text size value gives a value of "14" which means the text annotation is displayed with 14-point type, and the text font value indicates that an italicized font is used for the annotation. Text position values 460 includes two values, a starting position of the text box that contains the annotation given by a pixel coordinate and the width of the text box. The pixel coordinate of the starting point for the text box is given relative to the application display location provided in application data 410. According to other example embodiments, the pixel coordinate of the starting point for the text box is given relative to the display of the online collaborative session. The text box width value is given as "50," which means the text box is 50 pixels wide. Finally, the "TextPayload" value 462 indicates the text of the text annotation, which in the present embodiment is "This is sample text data."

While FIGS. 3A and 3B illustrate data for an annotation that is only a drawing and FIG. 4 illustrates data for an annotation that is only text, drawing and text annotations may be combined as illustrated in FIGS. 5A and 5B. As shown in FIGS. 5A and 5B, metadata 500 includes application data 510 and annotation data 550 that is analogous to the data described above with reference to FIGS. 3A, 3B and 4. Because the annotation defined by annotation data 550 contains both drawing and text annotations, pixel data 552 and pixel location data 554 are populated with data analogous to pixel data 352 and pixel location data 354 of FIG. 3B. Similarly, text data 558 is populated with data analogous to annotation text data 458 of FIG. 4.

Through the use of the data contained in metadata 300, 400 and 500 of FIGS. 3A, 3B, 4, 5A and 5B, an online collaborative session client may redraw the annotations defined by annotation data 350, 450, 550 when the applications associated with application data 310, 410, 510 become the focus of the online collaborative session or are moved within the display of the online collaborative session. For example, as described above with reference to FIG. 1, annotation 115 of display 100*a* is not included in display 100*c* after computer terminal application 110 takes the focus of the collaborative session from application 105. Specifically, the online collaborative session client would use application data 310, 410, 510 to determine the location of the windows associated with applications 105 and 110. The online collaborative session client would also use the annotation data 350, 450, 550 to determine the location of annotation 115. Based on this information, the online collaborative session client may determine that annotation 115 should no longer be displayed as the area covered by application 110 now covers the location of annotation 115.

More specifically, the data contained in metadata 300, 400, 500 allows for a layered architecture. The application that will be on the top represents the top most layer and will be given the highest priority to completely overlap the pixels of the applications that are also contained in the overlapping area. The desktop screen (i.e., the desktop background image) will be the bottom most layer and will be given lowest priority. Accordingly, in the example of FIG. 1, when application 110 takes priority, the online collaborative session client may redraw the area of display 100*c* now occupied by application 110 based upon data contained in metadata 300, 400, 500 associated with application 110. The redrawing of this area of display 100*c*, which is based upon the metadata associated with application 110, will result in a display 100*c* that does not include annotation 115. Annotation 115 will be omitted because the area where it was previously displayed has been redrawn based on the metadata associated with application 110, which does not contain data associated with annotation 115.

If the focus is later returned to application 105 (i.e., the display returns to display 100*a* of FIG. 1), the online collaborative session client will receive metadata for all of the active applications from the operating system. This data may indicate that application 105 now has the highest priority in the layered architecture, which will result in the online collaborative session client drawing the area covered by application 105 with the highest priority and based on the metadata 300, 400, 500 stored for application 105. The metadata associated with application 105 will include the data describing annotation 115, and therefore, when the area associated with application 105 is redrawn, annotation 115 will be included in this area as illustrated in display 100*a*.

The binding of annotation data to application data as illustrated in metadata 300, 400, 500 also allows annotations to move with application windows as illustrated in FIG. 6. Illustrated in FIG. 6 are display 600*a* at a first time, display 600*b* at a second time in which the techniques of the present disclosure are not implemented, and display 600*c* at the second but with implementation of the techniques of the present disclosure. Between the first time and the second time, application window 605 has been moved to the right. As shown in display 600*b*, if the techniques of the present disclosure are not implemented, annotation 615 does not move with application window 605. As illustrated in display 600*c*, the techniques of the present disclosure enable annotation 615 to move with application window 605. Specifically, upon the movement of window 605, the online collaborative session client application may receive application data from the operating system, and the online collaborative session client will redraw the application window 605 and annotation 615 based on application and annotation data, such as metadata 300, 400, and 500 of FIGS. 3A, 3B, 4, 5A and 5B. As illustrated in FIGS. 3A, 3B and 5, drawing annotations like annotation 615 may be associated with annotation data that includes the location of the pixels of the annotation relative to the area covered by the application with which the annotation is associated. Accordingly, when the online collaborative session client redraws annotation 615 for display 600*c* it will redraw annotation 615 such that annotation 615 follows application window 605.

Put differently, the shifting of application window 605 "shifts the origin" for the pixels associated with annotation 615. If it is assumed that annotation 615 is defined as illustrated in metadata 300 of FIGS. 3A and 3B, the pixel coordinates for annotation 615 are relative to the area data for application window 605. Therefore, shifting application window 605 will also shift the location of annotation 615, as illustrated in display 600*c*.

Figure 7:
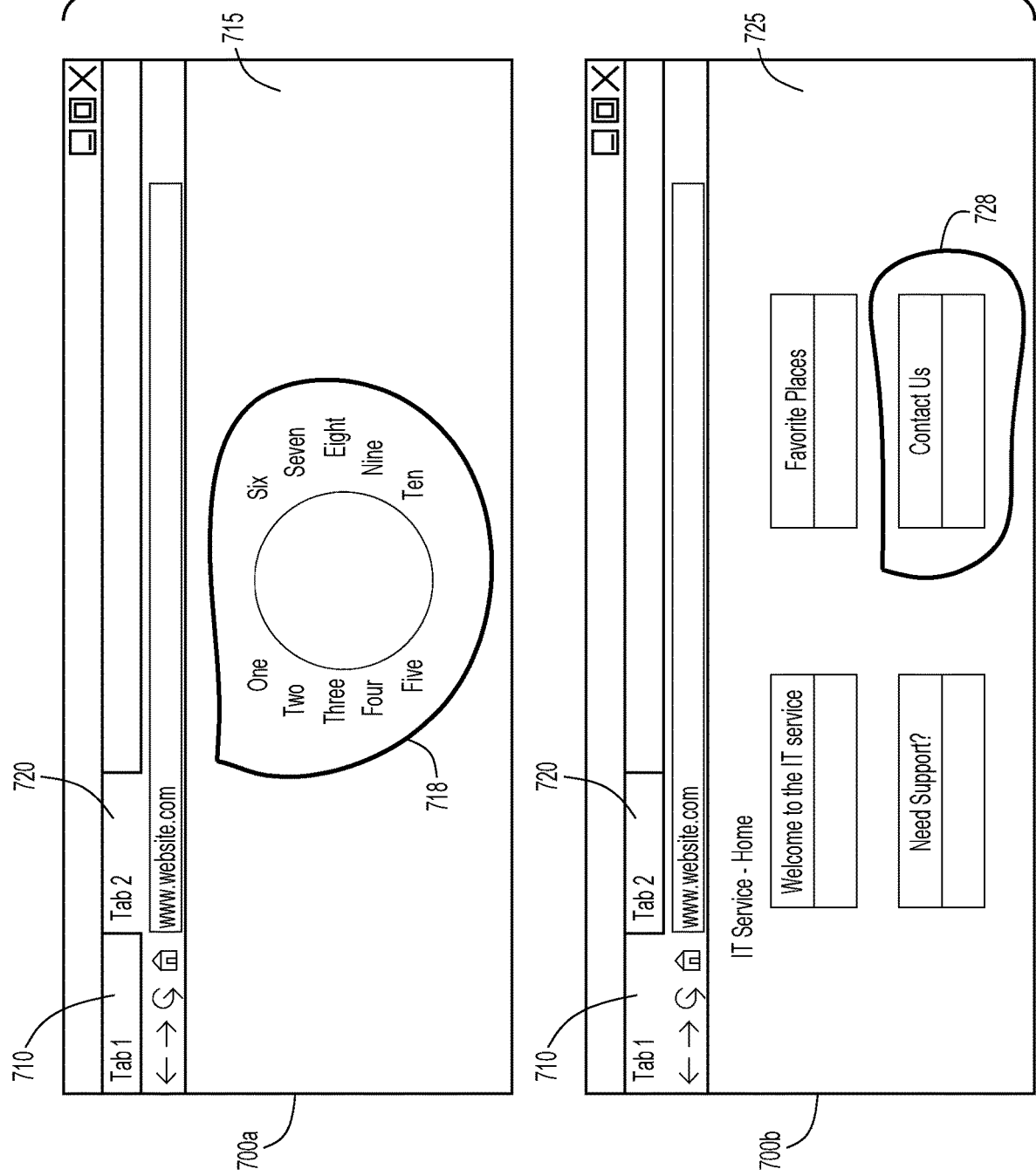
FIG. 7 is an illustration of the application aware annotation techniques of the present disclosure within the context of switching tabs within the same application window, according to an example embodiment.

With reference now made to FIG. 7, depicted therein is an illustration of how the techniques of the present disclosure provide "thread specific" annotations. Illustrated in FIG. 7 is a web browser application window in which display 700*a* shows tab 720 as being active, which displays web page 715 and annotation 718. Display 700*b* shows the same web browser window with tab 710 active displaying web page 725 and annotation 728. As can be seen by comparing display 700*a* with 700*b*, the annotations 718 and 728 are only displayed when their associated tab, tabs 720 and 710, respectively, are active. The techniques of the present disclosure provide for such annotations through, for example, the thread identifier described above with reference to FIGS. 3A, 3B, 4, 5A and 5B. As discussed above, annotations are bound to a combination of an application identifier, an instance identifier, and a thread identifier in metadata 300, 400 and/or 500. Using the web browser application of FIG. 7 as an example, the application identifier would identify the web browser application, the instance identifier would identify the window in which tabs 710 and 720 are arranged, and the thread identifier would identify a particular one of tabs 710 and 720. Because annotation data for annotations 718 and 728 is bound to a combination of the application identifier, the instance identifier, and the thread identifier, annotations may be displayed with thread-level granularity. According to the example of FIG. 7, this thread-level granularity provides for annotations that are specific to a particular tab of a web browser application.

Figure 8:
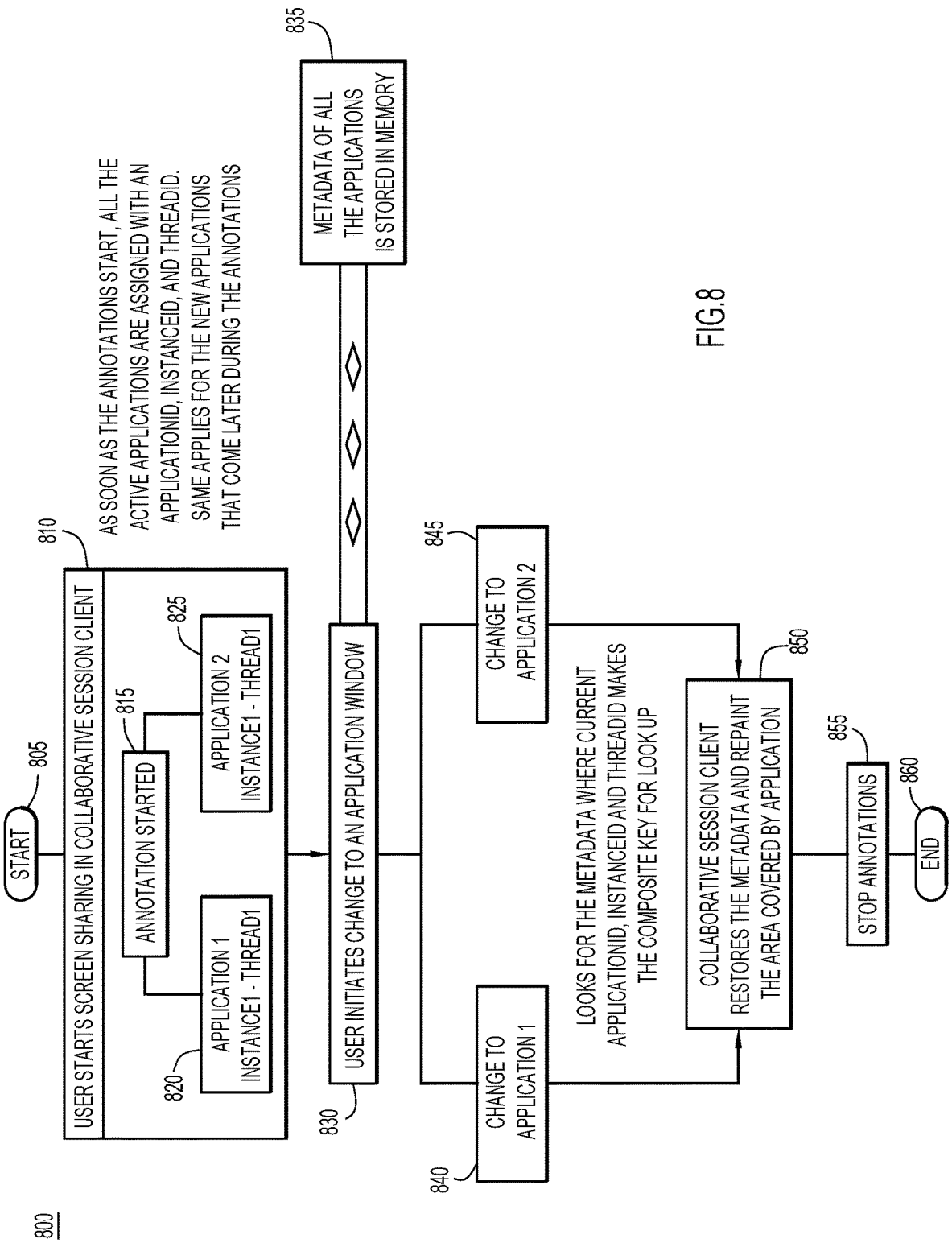
FIG. 8 is a flowchart illustrating a first process flow for implementing the application aware annotation techniques of the present disclosure, according to an example embodiment.

With reference now made to FIG. 8, depicted therein is a flowchart 800 illustrating a process flow implementing example embodiments of the techniques of the present disclosure. The process of flowchart 800 begins in operation 805 and continues to the sharing of a user's screen in operation 810 via an online collaborative session client in an online collaborative session. Upon the initiation of screen sharing in operation 810, the online collaborative session client may receive data associated with active applications from the operation system via which the online collaborative session client is executing. Based on this received data, the online collaborative session client may generate application metadata, such as application data 310, 410 and 510 of FIGS. 3A, 3B, 4, 5A and 5B, assigning application identifiers, instance identifiers and thread identifiers as appropriate.

In operation 815, a user in the online collaborative session begins making annotations, which may be made in either of a first application 820 or a second application 825. The annotating that takes place in operation 815 may result in the storing of annotation metadata, such as annotation data 350, 450 and/or 550 of FIGS. 3A, 3B, 4, 5A and 5B, that binds the annotation to either of the first application 820 or the second application 825. This annotation data may be bound to the application identifier, instance identifier and thread identifier of the application in which the annotation was made, as discussed above with reference to FIGS. 3A, 3B, 4, 5A and 5B.

In operation 830, a change is initiated to an application window associated with either of the first application or the second application. The change may be a change in the application that currently has the focus of the online collaborative session, a switch between a tab of an application, a change of page, sheet or slide within an application, a movement of an application window, or other actions known to the skilled artisan. This change may initiate a transfer of data from the operating system to the online collaborative session client, as illustrated in operation 835. In response to receiving this data from the operating system, the online collaborative session client will update its data, such as updating application data 310, 410 and/or 510 as described above with reference to FIGS. 3A, 3B, 4, 5A and 5B.

The processing of flowchart 800 then splits depending on the application to which the change of state was made. In either case, the online collaborative session client will use the application identifier, instance identifier and thread identifier associated with the change to access data stored at the online collaborative session client. For example, if the change is made to the first application, operation 840 will access the data stored in the online collaborative session client using the application identifier, instance identifier and thread identifier associated with the first application. If the change is made to the second application, operation 845 will access the data stored in the online collaborative session client using the application identifier, instance identifier and thread identifier associated with the second application.

In operation 850, the online collaborative session client will update the retrieved metadata to reflect the change made in operation 840 or 845. The online collaborative session will also redraw the area covered by the application to which the change was made, including redrawing annotations as appropriate.

In operation 855, the annotation process is stopped, and in operation 860, the process flow of flowchart 800 completes.

Figure 9:
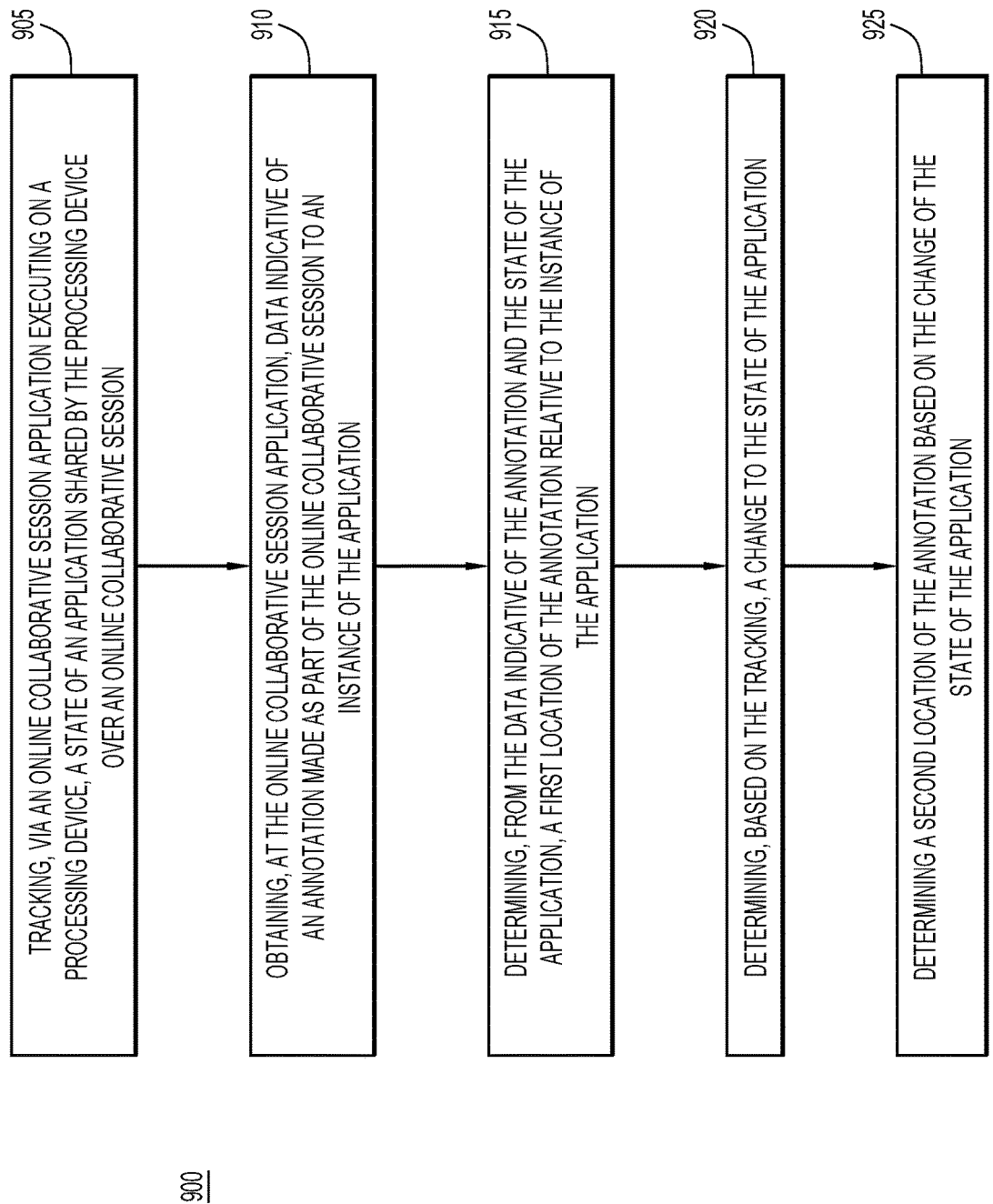
FIG. 9 is a flowchart illustrating a second process flow for implementing the application aware annotation techniques of the present disclosure, according to an example embodiment.

With reference now made to FIG. 9, depicted therein is a second flowchart 900 illustrating a process flow according to the techniques of the present disclosure. The process flow of flowchart 900 begins in operation 905 where an online collaborative session application executing on a processing device tracks the state of an application being shared over the online collaborative session. For example, the processing device may be embodied as a client device participating in an online collaborative session. According to other example embodiments, the processing device may be embodied as a server device facilitating the online collaborative session for a plurality of client devices.

In operation 910, the online collaborative session application obtains data indicative of an annotation made as part of the online collaborative session to an instance of the application. For example, operation 910 may be embodied as the receipt of data indicative of any of the annotations discussed above with reference to FIGS. 1-8. In operation 915, the processing device determines a first location of the annotation relative to the instance of the application based upon the data indicative of the application and the state of the application. For example, operation 915 may be indicative of the generation and/or storing of annotation data 350, 450 and/or 550 as described above with reference to FIGS. 3A, 3B, 4, 5A and 5B.

In operation 920, it is determined that there has been a change to the state of the application. This change in state may be embodied as any one of a number possible state changes, including the following non-exhaustive list of possible changes to the state of an application:
  a change in the focus of the application;
  minimizing the application,
  maximizing the application,
  moving a window associated with the application,
  covering the application with another application window,
  changing from one tab in an application to another,
  changing the page in an application document,
  changing the sheet in an application document,
  scrolling through an application document,
  changing the slide in an application document,
  closing an application, and
  opening a new application, among others.

Finally, in operation 925, a second location of the annotation is determined based on the change in state of the application. Operation 925 may be embodied as the redrawing of an annotation as described above with reference to FIGS. 1, 2, 6, 7 and 8. Operation 925 may also be embodied as a determination that the annotation should no longer be displayed because the annotation is covered by another application window, because the application associated with the application has been minimized, the page, slide, tab or sheet associated with annotation is no longer displayed, or for other reasons known to the skilled artisan.

The process flow of flowchart 900 may also include additional steps, such as those described above with reference to FIGS. 1, 2, 6, 7 and 8 without deviating from the concepts of the present disclosure.

Figure 10:
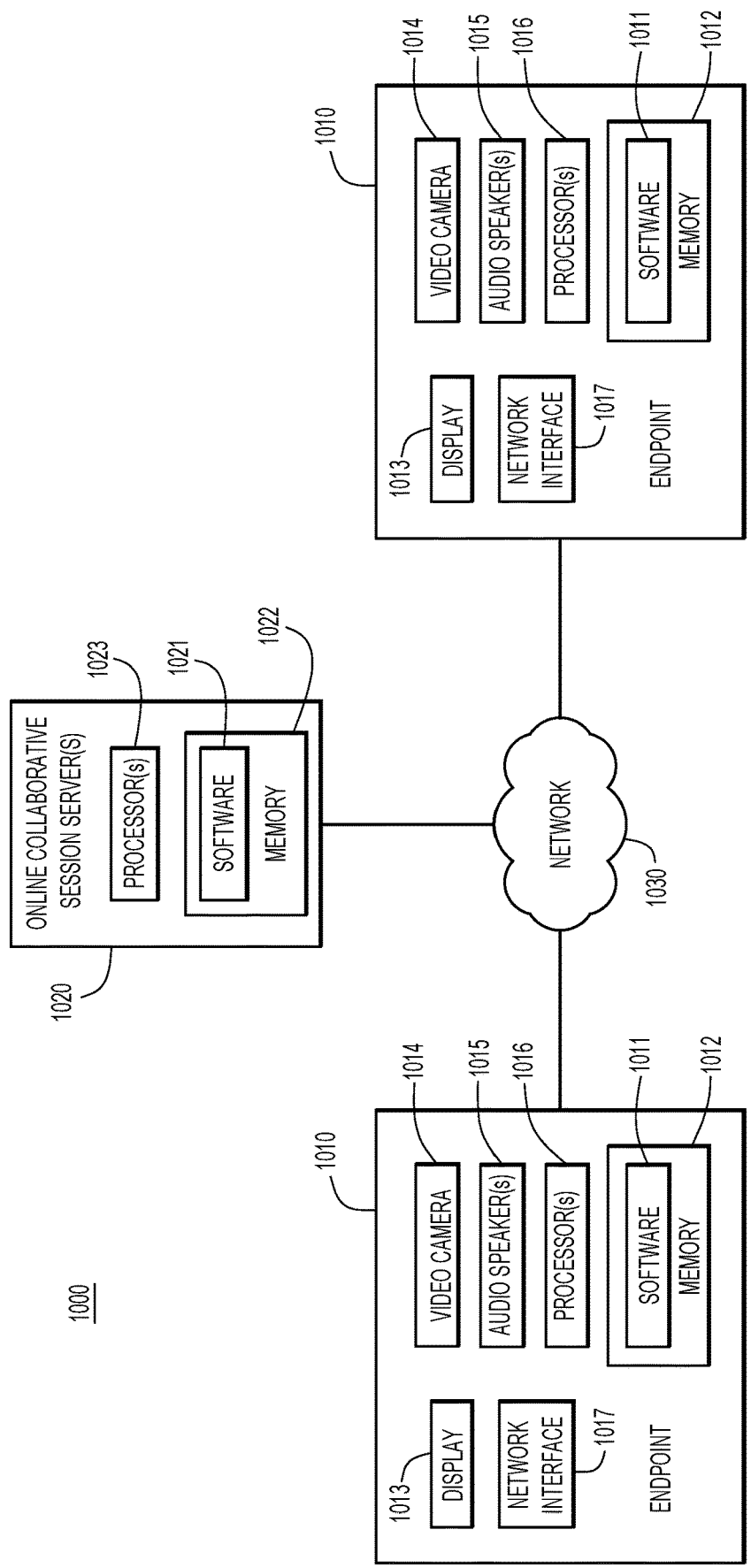
FIG. 10 is a functional block diagram of a network environment configured to implement the application aware annotation techniques of the present disclosure, according to an example embodiment.

With reference now made to FIG. 10, illustrated therein is a block diagram of an implementation of a system 1000 in which the techniques presented above may be used.

The system 1000 includes two or more online collaborative session endpoints 1010, online collaborative session server(s) 1020 and a network 1030 over which the endpoints communicate with the online collaborative session server 1020. The endpoints 1010 may take a variety of forms, such as desktop computers, laptop computers, tablets, mobile hand-held devices (Smartphones), or dedicated video conference endpoint devices. The endpoints 1010 may be configured with software to enable the endpoints 1010 to participate in web-based video communications, chat or instant message applications, conferences or other dedicated communication sessions that form the basis for an online collaborative session. Furthermore, endpoints 1010 may be configured to execute online collaborative session client applications that are configured to implement the techniques described above with reference to FIGS. 1-9. The data containing instructions for executing the online collaborative session client applications may be stored as software 1011 contained within memory 1012

The endpoints 1010 may include at least one video display 1013, at least one video camera 1014, one or more audio speakers (or headset) 1015 with a microphone, a processor 1016 (such as a microprocessor) and a network interface 1017 that enables (wired and/or wireless) network communication.

Online collaborative session server(s) 1020 may also be configured to execute online collaborative session applications that are configured to the implement the techniques described above with reference to FIGS. 1-9. The data containing instructions for executing the online collaborative session client application may be stored as software 1021 contained within memory 1022. The one or more processors 1023 may be configured to execute the instructions of software 1021 in order to carry out the techniques of the present disclosure.

Figure 11:
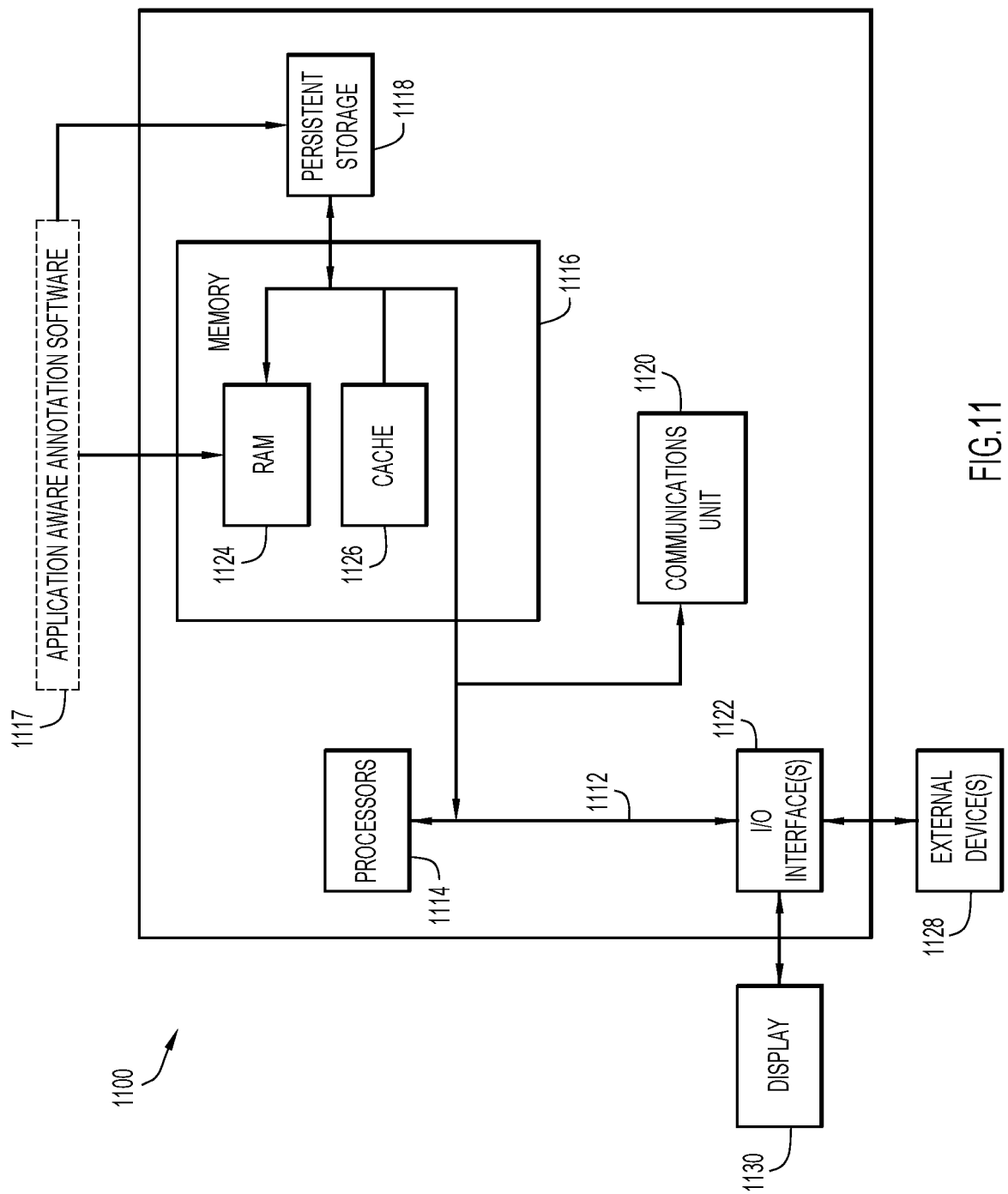
FIG. 11 is a functional block diagram of a device configured to implement the application aware annotation techniques of the present disclosure, according to an example embodiment.

With reference now made to FIG. 11, depicted therein is a hardware block diagram of a computing device 1100 that may perform the functions of any of the servers or computing entities referred to herein in connection with FIGS. 1-10. It should be appreciated that FIG. 11 provides only an illustration of one embodiment and does not imply any limitations with regard to the environments in which different embodiments may be implemented. Many modifications to the depicted environment may be made.

As depicted, the device 1100 includes a bus 1112, which provides communications between computer processor(s) 1114, memory 1116, persistent storage 1118, communications unit 1120, and input/output (I/O) interface(s) 1122. Bus 1112 can be implemented with any architecture designed for passing data and/or control information between processors (such as microprocessors, communications and network processors, etc.), system memory, peripheral devices, and any other hardware components within a system. For example, bus 1112 can be implemented with one or more buses.

Memory 1116 and persistent storage 1118 are computer readable storage media. In the depicted embodiment, memory 1116 includes random access memory (RAM) 1124 and cache memory 1126. In general, memory 1116 can include any suitable volatile or non-volatile computer readable storage media. Instructions for the Application Aware Annotation Software 1117 may be stored in memory 1116 or persistent storage 1118 for execution by processor(s) 1114.

One or more programs may be stored in persistent storage 1118 for execution by one or more of the respective computer processors 1114 via one or more memories of memory 1116. The persistent storage 1118 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 1118 may also be removable. For example, a removable hard drive may be used for persistent storage 1118. Other examples include optical and magnetic disks, thumb drives, and smart cards that are inserted into a drive for transfer onto another computer readable storage medium that is also part of persistent storage 1118.

Communications unit 1120, in these examples, provides for communications with other data processing systems or devices. In these examples, communications unit 1120 includes one or more network interface cards. Communications unit 1120 may provide communications through the use of either or both physical and wireless communications links.

I/O interface(s) 1122 allows for input and output of data with other devices that may be connected to computer device 1100. For example, I/O interface 1122 may provide a connection to external devices 1128 such as a keyboard, keypad, a touch screen, and/or some other suitable input device. External devices 1128 can also include portable computer readable storage media such as database systems, thumb drives, portable optical or magnetic disks, and memory cards.

Software and data used to practice embodiments can be stored on such portable computer readable storage media and can be loaded onto persistent storage 1118 via I/O interface(s) 1122. I/O interface(s) 1122 may also connect to a display 1130. Display 1130 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Additionally, terms such as "transmit" and "receive" are broadly used herein to refer to techniques for providing and obtaining data in network environments. For example, data may be provided and obtained through packets transmitted and received through networks. Data may also be provided and obtained through data communicated via out-of-band signaling or control channels used in a network environment.

In summary, the techniques provided for herein mitigate problems and limitations with the manner in which related art techniques provide annotations to shared documents in online collaborative sessions. Related art annotation techniques make it very difficult to have multiple annotations on different applications running in the same screen, which may result in confusing online collaborative session presentations. As organizations and individuals begin to rely more heavily on online and virtual communication systems, the ability to provide clear online collaborative session presentations becomes more important. Accordingly, the techniques presented herein provide for mechanisms to enhance user experiences with "application aware" annotations. Periodic check-pointing of application state is performed by online collaborative session applications. For example, when a user leaves an application screen (i.e., the current working application screen goes out of focus), the "mouse pointer" event in the annotation panel results in the collection of the following data: the application that the user is working on; the type of application, as in does the application support multiple threads like tabs in a web browser, slides in a slide presentation, sheets in in a spreadsheet application, etc.; the relative position of pixels drawn while creating the annotation; and the mapping of application identifiers to the state of the application. As soon as the online collaborative sessions is started, a unique application identifier may be assigned to active threads of applications and to applications starting during the online collaborative session. At the time of check-pointing, metadata is mapped to the application identifier of the application that the user is currently working on.

The techniques of the present application also provide for restoring of annotations. The techniques of the present disclosure may continuously poll from the underlying operating system or register the callbacks to the operating system about all of the events related to application switching and resizing so that annotations can be matched to these events. Whenever any such event is encountered, these techniques may restore annotated pixels for the new application that is into focus based on the lookup key (i.e., the application identifier, the instance identifier and/or the thread identifier).

Therefore, in accordance with the techniques of the present disclosure, provided for herein are methods that include: tracking, via an online collaborative session application executing on a processing device, a state of an application shared by the processing device over an online collaborative session; obtaining, at the online collaborative session application, data indicative of an annotation made as part of the online collaborative session to an instance of the application; determining, from the data indicative of the annotation and the state of the application, a first location of the annotation relative to the instance of the application; determining, based on the tracking, a change to the state of the application; and determining a second location of the annotation based on the change of the state of the application.

Also provided for are apparatuses that include one or more network interfaces and one or more processors. The one or more processors are configured to: track, via an online collaborative session application executing via the one or more processors, a state of an application shared via the one or more network interfaces over an online collaborative session; obtain, via the online collaborative session application, data indicative of an annotation made as part of the online collaborative session to an instance of the application; determine, from the data indicative of the annotation and the state of the application, a first location of the annotation relative to the instance of the application; determine, based on the tracking, a change to the state of the application; and determine a second location of the annotation based on the change of the state of the application.

The techniques of the present disclosure also provide for one or more tangible, non-transitory computer readable mediums. The one or more computer readable mediums are encoded with instructions. When executed by one or more processors, the instructions are operable to: track, via an online collaborative session application executing on a processing device, a state of an application shared by the processing device over an online collaborative session;

obtain, at the online collaborative session application, data indicative of an annotation made as part of the online collaborative session to an instance of the application; determine, from the data indicative of the annotation and the state of the application, a first location of the annotation relative to the instance of the application; determine, based on the tracking, a change to the state of the application; and determine a second location of the annotation based on the change of the state of the application.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    tracking, via an online collaborative session application executing on a processing device, a plurality of application windows shared by the processing device over an online collaborative session;
    tracking, via the online collaborative session application executing on the processing device, a state of an application window of the plurality of application windows, wherein the state of the application window comprises a vertical location of the application window relative to a vertical stacking of the plurality of application windows on a display on which the online collaborative session is displayed;
    tracking, via the online collaborative session executing on the processing device, a state of a plurality of window displays within the application window;
    obtaining, at the online collaborative session application, data indicative of an annotation made as part of the online collaborative session within the application window;
    determining, from the data indicative of the annotation, the state of the application window and the state of the plurality of window displays, a first location of the annotation relative to the application window and the plurality of window displays;
    determining, based on the tracking of the state of the application window, a change to the state of the application window; and
    determining a second location of the annotation based on the change of the state of the application window.

2. The method of claim 1, wherein tracking the state of the application window comprises tracking an area of the display on which the online collaborative session is displayed covered by the application window.

3. The method of claim 2, wherein tracking the state of the application window further comprises updating the area of the display on which the online collaborative session is displayed covered by the application window in response to one or more of:
    passage of a predetermined period of time;
    a change in focus of from the application window to another application window during the online collaborative session;
    a movement of the application window relative to the display during the online collaborative session;
    a maximization of the application window;
    a minimization of the application window; and
    a change from a first window display of the plurality of window displays to a second window display of the plurality of window displays.

4. The method of claim 2, wherein the data indicative of the first location comprises data indicative of a plurality of pixels corresponding to the annotation, wherein the data indicative of the plurality of pixels comprises a location for each one of the plurality of pixels within the area of the display on which the online collaborative session is displayed covered by the application window.

5. The method of claim 4, wherein an origin for the plurality of pixels is based on the area of the display on which the online collaborative session is displayed covered by the application window.

6. The method of claim 1, further comprising storing data indicative of the first location of the annotation, and
    wherein determining the second location comprises updating the data indicative of the first location.

7. The method of claim 1, wherein the plurality of window displays comprises one or more of:
    a plurality of tabs within the application window;
    a plurality of documents within the application window;
    a plurality of pages within the application window; and
    a plurality of slides within the application window.

8. An apparatus comprising:
    at least one display;
    one or more network interfaces; and
    one or more processors, wherein the one or more processors are configured to:
        track, via an online collaborative session application executing via the one or more processors, a plurality of application windows shared by the one or more processors over an online collaborative session;
        track, via the online collaborative session application executing via the one or more processors, a state of an application window of the plurality of application windows, wherein the state of the application window comprises a vertical location of the application window relative to a vertical stacking of the plurality of application windows on the display on which the online collaborative session is displayed;
        track, via the online collaborative session application executing via the one or more processors, a state of a plurality of window displays within the application window;
        obtain, via the online collaborative session application, data indicative of an annotation made as part of the online collaborative session within the application window;
        determine, from the data indicative of the annotation, the state of the application window and the state of the plurality of window displays, a first location of the annotation relative to the application window and the plurality of window displays;
        determine, based on the tracking of the state of the application window, a change to the state of the application window; and
        determine a second location of the annotation based on the change of the state of the application window.

9. The apparatus of claim 8,
    wherein the one or more processors are configured to track the state of the application window by tracking an area of the display on which the online collaborative session is displayed covered by the application window.

10. The apparatus of claim 9, wherein the one or more processors are configured to track the state of the application window by updating the area of the display on which the online collaborative session is displayed covered by the application window in response to one or more of:

passage of a predetermined period of time;
a change in focus of from the application window to another application window during the online collaborative session;
a movement of the application window relative to the display during the online collaborative session;
a maximization of the application window;
a minimization of the application window; and
a change from a first window display of the plurality of window displays to a second window display of the plurality of window displays.

11. The apparatus of claim 9, wherein the data indicative of the first location comprises data indicative of a plurality of pixels corresponding to the annotation, wherein the data indicative of the plurality of pixels comprises a location for each one of the plurality of pixels within the area of the display on which the online collaborative session is displayed covered by the application window.

12. The apparatus of claim 8, further comprising:
one or more memories;
wherein the one or more processors are further configured to store data indicative of the first location of the annotation in the one or more memories, and
wherein the one or more processors are configured to determine the second location by updating the data indicative of the first location in the one or more memories.

13. The apparatus of claim 8, wherein the plurality of window displays comprises one or more of:
a plurality of tabs within the application window;
a plurality of documents within the application window;
a plurality of pages within the application window; and
a plurality of slides within the application window.

14. One or more tangible, non-transitory computer-readable mediums encoded with instructions, wherein the instructions, when executed by one or more processors, are operable to:
track, via an online collaborative session application executing on a processing device, a plurality of application windows shared by the processing device over an online collaborative session;
track, via the online collaborative session application executing on the processing device, a state of an application window of the plurality of application windows, wherein the state of the application window comprises a vertical location of the application window relative to a vertical stacking of the plurality of application windows on a display on which the online collaborative session is displayed;
track, via the online collaborative session executing on the processing device, a state of a plurality of window displays within the application window;
obtain, at the online collaborative session application, data indicative of an annotation made as part of the online collaborative session within the application window;
determine, from the data indicative of the annotation, the state of the application window and the state of the plurality of window displays, a first location of the annotation relative to the application window;
determine, based on the tracking of the state of the application window, a change to the state of the application window; and
determine a second location of the annotation based on the change of the state of the application window.

15. The one or more tangible, non-transitory computer-readable mediums of claim 14, wherein the instructions operable to track the state of the application window are operable to track the state of the application window by tracking an area of the display on which the online collaborative session is displayed covered by the application window.

16. The one or more tangible, non-transitory computer-readable mediums of claim 15, wherein the instructions operable to track the state of the application window further comprise instructions operable to update the area of the display on which the online collaborative session is displayed covered by the application window in response to one or more of:
passage of a predetermined period of time;
a change in focus of from the application window to another application window during the online collaborative session;
a movement of the application window relative to the display during the online collaborative session;
a maximization of the application window;
a minimization of the application window; and
a change from a first window display of the plurality of window displays to a second window display of the plurality of window displays.

17. The one or more tangible, non-transitory computer-readable mediums of claim 15, wherein the data indicative of the first location comprises data indicative of a plurality of pixels corresponding to the annotation, wherein the data indicative of the plurality of pixels comprises a location for each one of the plurality of pixels within the area of the display on which the online collaborative session is displayed covered by the application window.

18. The one or more tangible, non-transitory computer-readable mediums of claim 17, wherein an origin for the plurality of pixels is based on the area of the display on which the online collaborative session is displayed covered by the application window.

19. The one or more tangible, non-transitory computer-readable mediums of claim 14, further comprising instructions operable to store data indicative of the first location of the annotation, and
wherein the instructions operable to determine the second location comprise instructions operable to update the data indicative of the first location.

20. The one or more tangible, non-transitory computer-readable mediums of claim 14, wherein the plurality of window displays comprises one or more of:
a plurality of tabs within the application window;
a plurality of documents within the application window;
a plurality of pages within the application window; and
a plurality of slides within the application window.

* * * * *